United States Patent [19]
Shaff

[11] Patent Number: 5,782,684
[45] Date of Patent: Jul. 21, 1998

US005782684A

[54] PORTABLE ANIMAL SKINNER

[76] Inventor: John V. Shaff, 20 N. Main St., Boonsboro, Md. 21713

[21] Appl. No.: 811,882

[22] Filed: Mar. 5, 1997

[51] Int. Cl.$^6$ .......................................... A22B 5/16
[52] U.S. Cl. ........................................ 452/128; 452/129
[58] Field of Search .................................... 452/125, 128, 452/129

[56] References Cited

U.S. PATENT DOCUMENTS

| Re. 23,471 | 3/1952 | Coad | 452/128 |
|---|---|---|---|
| 2,536,268 | 8/1951 | Dillon . | |
| 3,371,375 | 3/1968 | Bartel . | |
| 4,299,009 | 11/1981 | Tournier | 452/128 |
| 5,336,124 | 8/1994 | Garside . | |
| 5,453,042 | 9/1995 | Novello . | |
| 5,626,514 | 5/1997 | Rothove | 452/128 |

FOREIGN PATENT DOCUMENTS

| 1645316 | 5/1991 | U.S.S.R. | 452/125 |
|---|---|---|---|

*Primary Examiner*—Willis Little
*Attorney, Agent, or Firm*—Richard C. Litman

[57] ABSTRACT

A self-contained, independently operating, adjustable, portable animal skinning device for use with hunting game features telescoping metal rods. The animal skinner incorporates parallel upper and lower racks, each having a plurality of hollow, telescoping metal rods that facilitate the length adjustment thereof. Two opposingly disposed end supports sandwich the telescoping metal rods therebetween. A cable extends at least the combined length of the upper rack, the lower racks, and the vertical distance, therebetween. One end of the cable engages a clamp assembly, which removably secures an animal hide to the cable. The cable extends along the upper rack, engaging a roller on one of the horizontally-oriented hollow metal rods, and extends downward and along the lower rack. The other end of the cable operably engages a winch that in turn operably engages a portable AC power source, such as a 12 volt marine battery. A chain detachably engages the upper horizontal rod on the end support with the winch. An animal to be skinned is chained to the upper rack at a point below its head, to secure it thereto, and the clamp assembly is secured to the animal hide, whereupon the winch is actuated, urging the cable towards it and spooling it thereon to ultimately facilitate skinning as the cable is displaced away from the head of the animal. Once the hide is completely removed, it travels with the cable to be safely deposited onto the lower rack.

6 Claims, 4 Drawing Sheets

PORTABLE ANIMAL SKINNER

BACKGROUND OF THE INVENTION

1. Field of the Invention

The present invention relates to animal-skinning equipment, and more specifically to portable, adjustable devices for skinning large animals while on hunting expeditions.

2. Description of the Prior Art

A diverse array of devices have aimed to facilitate animal skinning for various purposes. Animal skinning operations figure significantly in the food preparation and apparel industries. Accordingly, devices to skin animal carcasses have been employed in these areas to expedite production.

U.S. Pat. No. 2,536,268, for example, discloses an adjustable slaughtering cradle having a frame made from telescoping metal tubing, which allows it to conform to the dimensions of the animal. This feature supports stably the animal carcass at a convenient height, to promote cleaner and better working conditions that results in cleaner hides.

The fish skin removal device of U.S. Pat. No. 5,453,042 incorporates a table-like device to support the fish body, anchoring means for holding the fish in position and a motor-driven clamp which pulls the skin from the fish's body. This device allows commercial fisherman to begin processing fish while on-board the fishing vessel.

Also of note, U.S. Pat. No. 3,371,375 discloses a machine for skinning small animals, such as minks, for industrial pelt cultivation. The device of '375 comprises an elongate frame for supporting an animal carcass and a chain-driven hook that removes the animal hide.

Another situation where animal-skinning devices figure involves hunting for large game. The horizontal skinning and protection apparatus of U.S. Pat. No. 5,336,124 comprises a head harness that secures the head of a game animal to a stationary object, and a skin remover that is attached to the skin of the game animal and to a vehicle bumper, whereby applying force with the vehicle to the skin of the game animal facilitates the removal thereof. A wrap-around game bag oriented underneath the game, animal then catches the skinned game animal after removal of the head harness therefrom.

While uncomplicated and portable, the skinning device of '124 requires both a vehicle and a tree for its operation. Furthermore, the tree must possess the size and stability to resist the force that the moving vehicle exerts on it, transmitted by the skin of the game animal. The tree must also be in close proximity to the vehicle at the proposed skinning site, and the vehicle must be operable for a distance sufficient to provide the necessary skinning force. These factors illustrate how the operation of the device of '124 critically depends on the surroundings and on the vehicle employed, and how unfavorable conditions would compromise the utility of the device.

In light of the shortcomings of the above inventions and patents, there is a need for a self-contained, independently operating, adjustable, portable animal skinning device for use with hunting game.

None of the above inventions and patents, taken either singly or in combination, is seen to describe the instant invention as claimed.

SUMMARY OF THE INVENTION

A self-contained, independently operating, adjustable, portable animal skinning device for use with hunting game features telescoping metal rods. The telescoping metal rod construction allows the animal skinner to be at once sturdy and lightweight, facilitating its portability. Furthermore, this design allows the device to be disassembled and reassembled as needed. The animal skinner is adjustable, where the telescoping rod assembly allows it to conform to the dimensions of the animal. Also, the animal skinner of the present invention does not critically depend on or require surrounding, separate elements to perform its function, making unfavorable conditions such as tree size, forrest density and vehicle access immaterial to the independent operation of the self-contained device.

Structurally, the animal skinner incorporates parallel upper and lower racks, each having a plurality of hollow, telescoping metal rods that facilitate the length adjustment thereof. Two opposingly disposed end supports sandwich the telescoping metal rods therebetween. The supports each comprise a pair of parallel, vertically-oriented hollow metal rods, each engaging a stand for upright positioning thereof. Each pair of vertical metal rods in turn integrally connects to two parallel, horizontally-oriented hollow metal rods at each end thereof. Each of the horizontal rods comprises a plurality of sockets that protrude therefrom and are perpendicular thereto. The sockets protrude in the same direction, and are aligned in a linear formation, whereby the proximate ends of each of the telescoping metal bars insertably engage the sockets. Furthermore, the sockets each define a plurality of holes, and the proximate portions of the metal rods define a corresponding number of holes. Upon insertion of the metal rods into the sockets, the two sets of holes align to receive pins to secure the metal rods in place when using the device of the current invention to skin an animal.

A cable extends at least the combined length of the upper rack, the lower rack, and the vertical distance therebetween. One end of the cable engages a clamp assembly, which removably secures an animal hide to the cable. The cable extends along the upper rack, engaging a roller on one of the horizontally-oriented hollow metal rods, and extends downward and along the lower rack. The other end of the cable operably engages a winch that in turn operably engages a portable AC power source, such as a 12 volt marine battery. A chain detachably engages the upper horizontal rod on the end support with the winch.

An animal to be skinned is placed onto the upper rack with its head oriented proximate to the end support that engages the winch. The animal is chained to the upper rack at a point below its head, to secure it thereto. The clamp assembly is then secured to the animal hide, whereupon the winch is actuated, urging the cable towards it and spooling it thereon to ultimately facilitate skinning as the cable is displaced away from the head of the animal. Once the hide is completely removed, it travels with the cable along the upper rack, over the roller, and downward, proximate to the lower rack. Once the hide is safely supported by the lower rack, the winch can be shut off, and the clamp assembly can be removed from the hide.

Accordingly, it is a principal object of the invention to provide a portable animal skinning device for use with hunting game.

It is another object of the invention to be self-contained and to operate independently.

It is a further object of the invention to adjust so that it conforms to the dimensions of the animal, so as to improve upon and simplify the skinning thereof.

Still another object of the invention is to incorporate a design allowing the device to be disassembled and reassembled as needed.

It is also an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
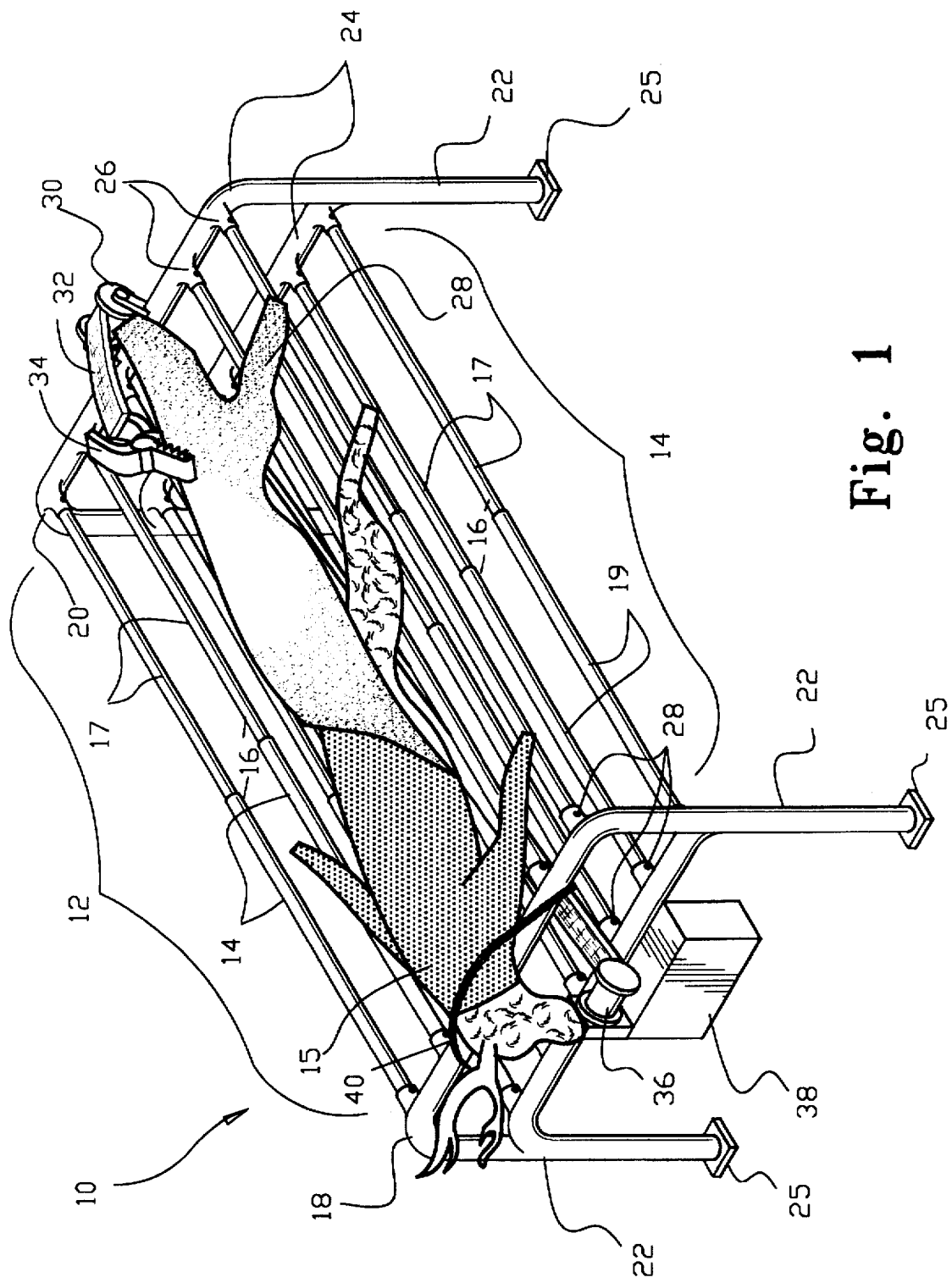
FIG. 1 is a perspective environmental view of the portable animal skinner of the present invention.

FIG. 1 illustrates the present invention 10 as fully assembled and supporting an animal 15 to be skinned. The animal skinner incorporates upper and lower racks 12,14, which are disposed parallel to each other. Both upper and lower racks 12,14 comprise a plurality of hollow, telescoping metal rods 16. Each of telescoping rods 16 comprises a first hollow rod 17 and a second hollow rod 19. The inner diameter of rod 19 is slightly larger than the outer diameter of rod 17, so that rod 17 insertably engages rod 19, and can be slidably displaced therein, to facilitate the length adjustment of telescoping rods 16.

Figure 2:
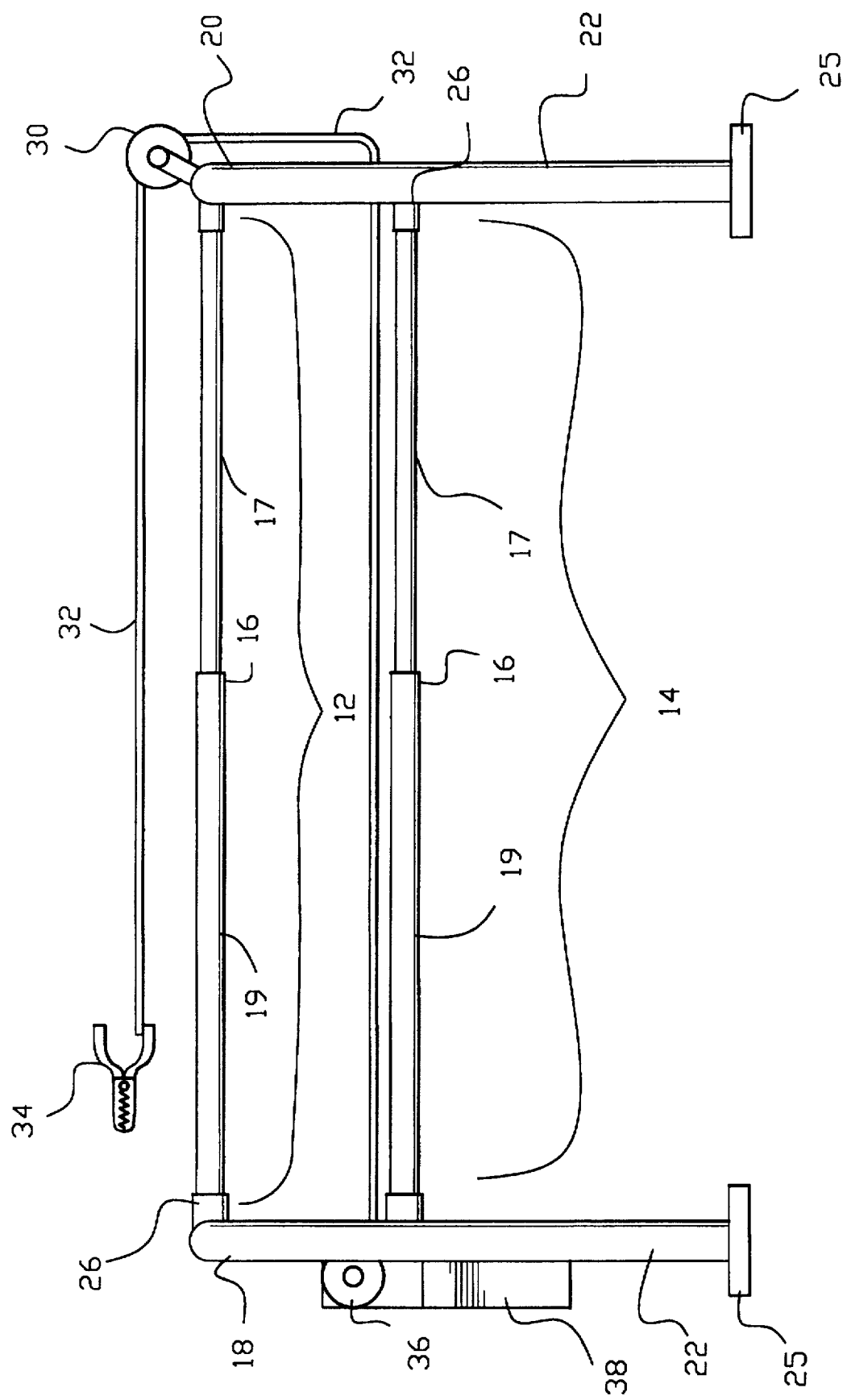
FIG. 2 is a side elevational view of the portable animal skinner shown in FIG. 1.
Figure 3:
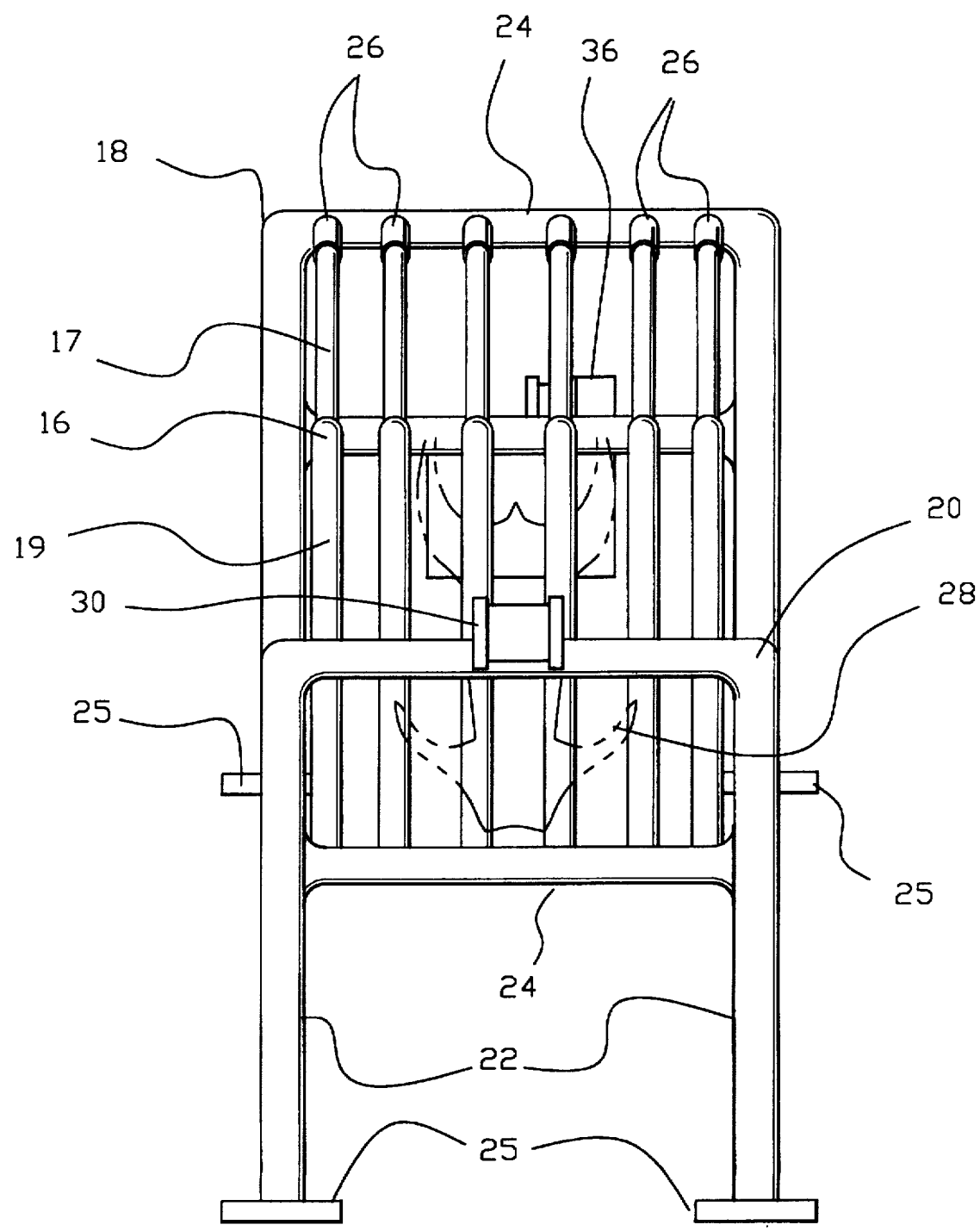
FIG. 3 is a perspective frontal view of the portable animal skinner shown in FIG. 1.
Figure 4:
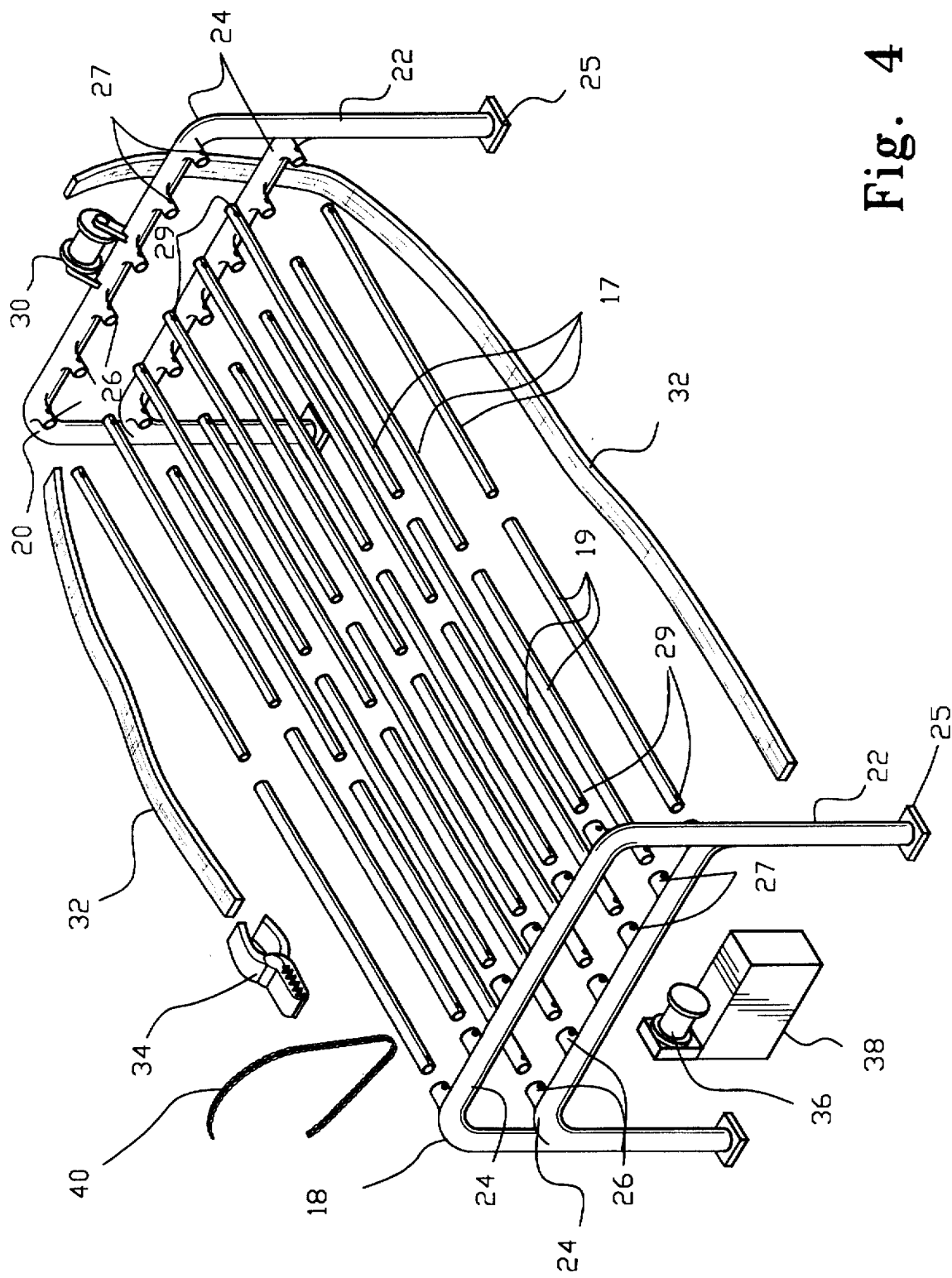
FIG. 4 is a perspective exploded view of the portable animal skinner shown in FIG. 1.

In the preferred embodiment of the present invention, upper and lower racks 12,14 each include six metal rods 16, as shown in FIG. 3 and FIG. 4. Two opposingly disposed end supports 18,20 sandwich metal rods 16 therebetween. Supports 18,20 each comprise a pair of parallel, vertically-oriented hollow metal rods 22, each engaging a stand 25 for upright positioning thereof. Vertical metal rods 22 of each of end supports 18,20 integrally connect to a pair of parallel, horizontally-oriented hollow metal rods 24 therebetween. In the preferred embodiment of the invention, each of horizontal rods 24 comprises six sockets 26 that protrude from the horizontal rod 24 and are perpendicular thereto, as shown in FIG. 4. All six of sockets 26 protrude in the same direction, and are aligned with each other along the horizontal rod 24 to create a linear formation. Each of sockets 26 has an inner diameter that is larger than the outer diameter of metal rods 16, so that rods 17 and rods 19 insertably engage sockets 26 of the horizontal rods 24 of supports 18,20, respectively, as shown in FIG. 3. Alternatively, FIGS. 1 and 2 illustrate rods 17 and rods 19 insertably engaging sockets 26 of the horizontal rods 24 of supports 20,18, respectively. Furthermore, sockets 26 each define a plurality of holes 27, and the proximate portions of metal rods 16 define a corresponding number of holes 29, as shown in FIG. 4. Upon insertion of metal rods 16 into sockets 26, metal rods 16 are rotated so that holes 27 are in registry with holes 29. Now referring to FIG. 1, pins 28 insertably engage holes 27 and holes 29, to secure rods 16 in place when using the device of the current invention to skin an animal. In the preferred embodiment of the invention, sockets 26 each define a pair of opposingly disposed holes 27 and the proximate portions of metal rods 16 define a pair of correspondingly placed, opposingly disposed holes 29.

FIGS. 1, 3 and 4 show a roller 30 engaging the horizontal rod 24 of end support 20 that supports upper rack 12 at its substantial center. A cable 32 extends at least the combined length of upper rack 12, lower rack 14, and the vertical distance therebetween. One end of cable 32 engages a clamp assembly 34, which removably secures the hide 28 of animal 15 to cable 32. Cable 32 extends the length of upper rack 12, engages roller 30, and extends downward, proximate to lower rack 14. Cable 32 then extends the length of lower rack 14. The other end of cable 32 operably engages a winch 36. Winch 36 engages the horizontal rod 24 of end support 18 proximate to lower rack 14, and is suspended therefrom in the preferred embodiment. Winch 36 also operably engages a portable AC power source 38, such as a 12 volt marine battery, which is similarly suspended. In the preferred embodiments of the invention, power source 38 is rechargeable, or can be powered by using automobile jumper cables to transfer current thereto. A chain 40 detachably engages the upper horizontal rod 24 of end support 18.

To skin animal 15 using the present invention, animal 15 is placed onto upper rack 12, with its head oriented proximate to end support 18. Chain 40 is placed across animal 15, at a point below its head, to secure animal 15 to upper rack 12. Clamp assembly 34 is then secured to hide 28, below the point where chain 40 contacts animal 15. Once animal 15 is in place, winch 36 is actuated, urging cable 32 towards it and spooling it thereon. The pulling force exerted on cable 32 enables the skinning of animal 15 as cable 32 is displaced away from the head of animal 15. While clamp assembly 34 engages hide 28 to facilitate its displacement with that of cable 32, chain 40 provides the resistance to maintain the skinned carcass of animal 15 in place on upper rack 12. Once hide 28 is completely removed from animal 15, it travels with cable 32 towards the horizontal rod 24 of support 20 that engages upper rack 12. In sequence, cable 32 and hide 28 travel over roller 30, and downward, proximate to lower rack 14. Clamp assembly 34 ensures that hide 28 travels with cable 32, once it is free of the carcass of animal 15, and clears roller 30. As cable 32 approaches winch 36, hide 28 engages lower rack 14. Once hide 28 is safely supported by lower rack 14, as shown in phantom lines in FIG. 3, winch 36 can be shut off, and clamp assembly 34 can be removed from hide 28.

The telescoping metal rod construction of the animal skinner of the present invention allow it to be at once sturdy and lightweight, facilitating its portability. Furthermore, this design allows the device to be disassembled and reassembled as needed.

An additional benefit of the animal skinner of the present invention involves its adjustability, where the telescoping rod assemblies of upper and lower racks 12,14 allows them to conform to the dimensions of the animal. This feature supports stably animal 15 at a convenient height, to improve upon and simplify the skinning thereof.

Also of note, the animal skinner of the present invention does not critically depend on or require surrounding, separate elements to perform its function, making unfavorable conditions such as tree size, forrest density and vehicle access immaterial to the independent operation of the self-contained device.

It is to be understood that the present invention is not limited to the sole embodiment described above, but encompasses any and all embodiments within the scope of the following claims.

I claim:

1. A portable animal skinning device, said animal skinning device comprising:

upper and lower racks, said racks disposed parallel to each other, each said rack comprising a plurality of hollow telescoping rods, said telescoping rods arranged in a planar formation, and each of said telescoping rods comprising first and second hollow rods, said first rod having an inner diameter greater than the outer diameter of said second rod so that said second rod insertably engages said first rod and can be slidably displaced therein, to facilitate the length adjustment of said telescoping rods;

opposingly disposed first and second end supports, said end supports each comprising a pair of substantially parallel, vertically-oriented hollow metal rods, a pair of substantially parallel, horizontally-oriented hollow metal rods and a pair of stands, said vertical rods integrally connecting to said horizontal rods, sandwiching said horizontal rods therebetween and said stands engaging said vertical rods to facilitate upright positioning thereof;

coupling means for removably securing the proximate ends of said telescoping rods of said upper and lower racks to said horizontal rods of said first and second end supports;

means for removably securing an animal to be skinned to said upper rack during skinning;

means for removably engaging the hide of an animal to be skinned, and;

means for displacing the hide of an animal from said animal on said upper rack to said lower rack.

2. The portable animal skinning device according to claim 1, wherein said coupling means for removably securing the proximate ends of said telescoping rods of said upper and lower racks to said horizontal rods of said first and second end supports comprises a plurality of sockets and pins, said sockets integrally connecting to and protruding from said horizontal rods in a substantially linear formation, and of a sufficient diameter to receive said proximate ends of said telescoping rods, said sockets and said proximate ends of said telescoping rods defining a plurality of holes, whereby upon insertion of said proximate ends of said telescoping rods into said sockets, said rod holes are in registry with said socket holes, and said pins insertably engage said rod holes and said socket holes to secure said telescoping rods in place when using the device of the current invention to skin an animal.

3. The portable animal skinning device according to claim 1, wherein said means for removably securing an animal to be skinned to said upper rack during skinning comprises a chain, said chain having first and second ends, said first and second ends removably engaging said horizontal rod of said first end support proximate to said upper rack, so that prior to skinning an animal, said chain is placed across said animal at a point below its head, whereby said chain provides the resistance to maintain the carcass of animal in place on upper rack during skinning thereof.

4. The portable animal skinning device according to claim 1, wherein said means for removably engaging the hide of an animal to be skinned comprises a clamp assembly, so that prior to skinning an animal, said clamp assembly is removably secured to the animal hide, at a point below where said chain contacts said animal.

5. The portable animal skinning device according to claim 1, wherein said means for displacing the hide of an animal from said animal on said upper rack to said lower rack comprises a hide-pulling assembly, said hide-pulling assembly comprising:

a cable, said cable having first and second ends and extending at least the combined length of said upper rack, said lower rack, and the vertical distance therebetween, said first end engaging said clamp assembly;

a roller member, said roller member engaging the top horizontal rod of said second end support proximate to said upper rack;

a winch, said winch engaging the horizontal rod of said first end support proximate to said lower rack, and said winch operably engaging said second end of said cable, and;

a portable AC power source, said power source engaging the horizontal rod of said first end support proximate to said lower rack, and said power source operably engaging said winch, whereby activation of said winch urges said cable towards it, spooling it thereon, to enable the skinning of the animal as said cable is displaced away from the head of the animal over said roller member and downward, proximate to said lower rack, said clamp assembly engaging the hide to facilitate displacement thereof with that of said cable, whereupon the hide is completely removed from the animal and travels with said cable towards the horizontal rod of said first end support proximate to said lower rack.

6. A method for skinning an animal, said method comprising:

adjusting the length of upper and lower racks of an animal-skinning apparatus, so that said upper and lower racks accommodate the dimensions of an animal to be skinned;

placing the animal to be skinned on the top rack of the animal-skinning apparatus, and securing it thereto;

securing a clamp to the hide of the animal to be skinned, the clamp engaging a cable, which in turn engages a winch;

activating the winch, whereby the cable is displaced away from the head of the animal over a roller member and downward, proximate to the lower rack of the animal-skinning apparatus, the clamp engaging the hide to facilitate displacement thereof;

completely removing the hide from the animal;

displacing the removed hide along the lower rack of the animal-skinning apparatus;

depositing the removed hide on the lower rack of the animal-skinning apparatus, and;

de-activating the winch.

\* \* \* \* \*